United States Patent
Che et al.

(10) Patent No.: US 10,025,605 B2
(45) Date of Patent: Jul. 17, 2018

(54) MESSAGE HANDLER COMPILING AND SCHEDULING IN HETEROGENEOUS SYSTEM ARCHITECTURES

(71) Applicant: Advanced Micro Devices, Inc., Sunnyvale, CA (US)

(72) Inventors: Shuai Che, Bellevue, WA (US); Marc S. Orr, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 103 days.

(21) Appl. No.: 15/094,615

(22) Filed: Apr. 8, 2016

(65) Prior Publication Data

US 2017/0293499 A1      Oct. 12, 2017

(51) Int. Cl.
*G06F 9/455*      (2018.01)

(52) U.S. Cl.
CPC ................. *G06F 9/4552* (2013.01)

(58) Field of Classification Search
CPC ............... G06F 8/52; G06F 8/443; G06F 8/47
USPC ........................................................ 717/146
See application file for complete search history.

(56) References Cited

U.S. PATENT DOCUMENTS

| | | | | |
|---|---|---|---|---|
| 7,194,733 B2 * | 3/2007 | Ringseth | ................ | H04L 67/02 709/230 |
| 7,257,817 B2 * | 8/2007 | Cabrera | .............. | H04L 43/0811 719/310 |
| 7,363,346 B2 * | 4/2008 | Groner | ................ | G06F 11/1076 709/214 |
| 7,971,195 B2 * | 6/2011 | Ringseth | ................ | H04L 67/02 717/136 |
| 8,015,253 B1 * | 9/2011 | Zapata | .................. | G06F 21/606 709/206 |
| 8,191,040 B2 * | 5/2012 | Hejlsberg | .............. | G06F 9/4488 717/114 |
| 2013/0212145 A1 | 8/2013 | Archer et al. | | |
| 2014/0282613 A1 | 9/2014 | Jea et al. | | |
| 2014/0304474 A1 | 10/2014 | Reinhardt et al. | | |
| 2015/0193414 A1 * | 7/2015 | Peters | ..................... | H04L 51/04 715/230 |
| 2015/0256612 A1 * | 9/2015 | Hinni | ...................... | H04L 67/16 709/202 |
| 2015/0261457 A1 | 9/2015 | Hechtman et al. | | |

(Continued)

OTHER PUBLICATIONS

Bonachea, D., "GASNet Specification, v1.1," Report No. UCB/CSD-2-1207, Computer Science Division (EECS), Oct. 2002, 37 pages.

(Continued)

*Primary Examiner* — John Chavis
(74) *Attorney, Agent, or Firm* — Zagorin Cave LLP

(57) ABSTRACT

A receiving node in a computer system that includes a plurality of types of execution units receives an active message from a sending node. The receiving node compiles an intermediate language message handler corresponding to the active message into a machine instruction set architecture (ISA) message handler and the receiver executes the ISA message handler on a selected one of the execution units. If the active message handler is not available at the receiver, the sender sends an intermediate language version of the message handler to the receiving node. The execution unit selected to execute the message handler is chosen based on a field in the active message or on runtime criteria in the receiving system.

19 Claims, 3 Drawing Sheets

(56) References Cited

U.S. PATENT DOCUMENTS

2016/0132612 A1* 5/2016 Warila ............... G06F 8/24
715/234
2016/0285794 A1* 9/2016 Naidu ............... H04L 51/14

OTHER PUBLICATIONS

Chun, B. et al., "CloneCloud: Elastic Execution between Mobile Device and Cloud," EuroSys'11, Apr. 10-13, 2011, Salzburg, Austria, 14 pages.

Cuervo, E., et al., "MAUI: Making Smartphones Last Longer with Code Offload," MobiSys'10, Jun. 15-18, 2010, San Francisco, CA, 14 pages.

HSA Foundation, HSA Programmer's Reference Manual: HSAIL Virtual ISA and Programming Model, Compiler Writer's Guide, and Object Format (BRIG), Publication #: 49828, Rev. Version 0.95, May 1, 2013, 358 pages.

Kyriazis, G., "Heterogeneous System Architecture: A Technical Review," Advanced Micro Devices, Rev. 1, Aug. 30, 2012, pp. 1-18.

Von Eicken, T., et al., "Active Messages: a Mechanism for Integrated Communication and Computation," Proceedings of the 19th International Symposium on Computer Architecture, ACM Press, May 1992, pp. 1-20.

Whitecotton, B., "From the HSAIL Spec Editor," downloaded from http://developer.amd.com/community/blog/2013/05/29/hsa-foundation-has-just-released-version-0-95-of-the-programmers-reference-manual-which-we-affectionately-refer-to-as-the-hsail-spec/, Jul. 1, 2016, 3 pages.

Willcock, J., et al., "AM++: A Generalized Active Message Framework," PACT'10, Sep. 11-15, 2010, Vienna, Austria, 10 pages.

U.S. Appl. No. 15/174,624, filed Jun. 6, 2016, entitled "Offloading Execution of an Application by a Network Connected Device," by inventor Shuai Che.

* cited by examiner

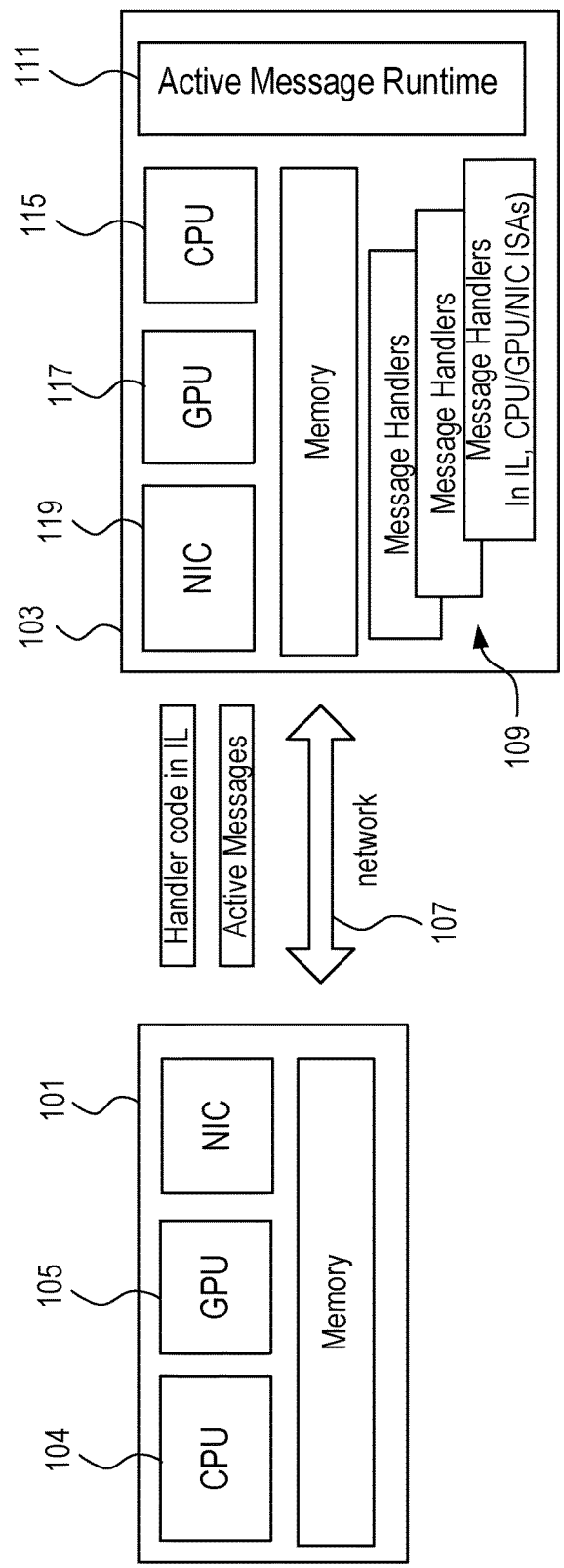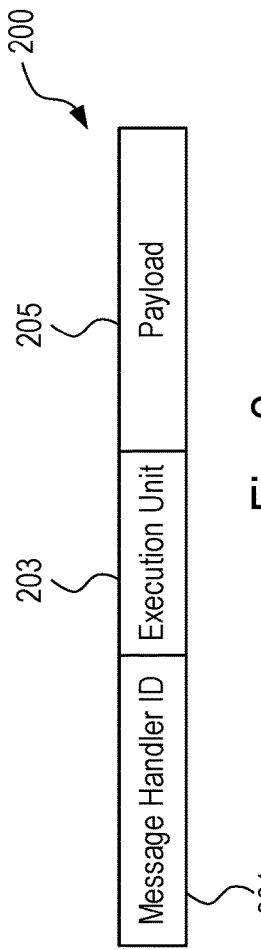

MESSAGE HANDLER COMPILING AND SCHEDULING IN HETEROGENEOUS SYSTEM ARCHITECTURES

BACKGROUND

Field of the Invention

This disclosure relates to active messaging and more particularly to the use of active messaging in heterogeneous computing systems.

Description of the Related Art

An active message is a communication from a sending node in a computer system to a receiving node instructing the receiving node of the computer system to execute code to implement the function associated with an active message. Active messages are widely used in Message Passing Interface (MPI) and Partitioned Global Address Space (PGAS) implementations. Active messages help achieve parallelism in computing. The active message typically includes a pointer to the message handler (code) in the receiving node that executes the function, and includes the data to be processed by the function, and/or a pointer to a memory location associated with the function as a source or destination for data associated with execution of the function.

SUMMARY OF EMBODIMENTS OF THE INVENTION

In order to improve performance of systems utilizing heterogeneous system architectures, active messages may be adopted to exploit features of heterogeneous systems. Accordingly, in one embodiment a method is provided that includes receiving an active message at a receiver that includes a plurality of types of execution units. The receiver compiles an intermediate language message handler corresponding to the active message into a machine instruction set architecture (ISA) message handler and the receiver executes the ISA message handler on a selected one of the execution units.

In another embodiment an apparatus includes a receiving device having a plurality of execution units. A communication interface in the receiving device is coupled to receive an active message identifying a message handler corresponding to the active message. The receiving device is responsive to receipt of the active message to compile an intermediate language message handler corresponding to the active message into a machine instruction set architecture (ISA) message handler for execution on a selected one of the execution units.

In another embodiment a method includes storing a first message handler in a precompiled instruction set architecture (ISA) format at a receiver, storing a second message handler in an intermediate language format at the receiver, and receiving a third message handler in an intermediate format from a sender of a first active message.

BRIEF DESCRIPTION OF THE DRAWINGS

The present invention may be better understood, and its numerous objects, features, and advantages made apparent to those skilled in the art by referencing the accompanying drawings.

FIG. 1 illustrates an active message framework for APU/GPU clusters according to an embodiment.

FIG. 2 illustrates an example of an active message.

DETAILED DESCRIPTION

Figure 3:
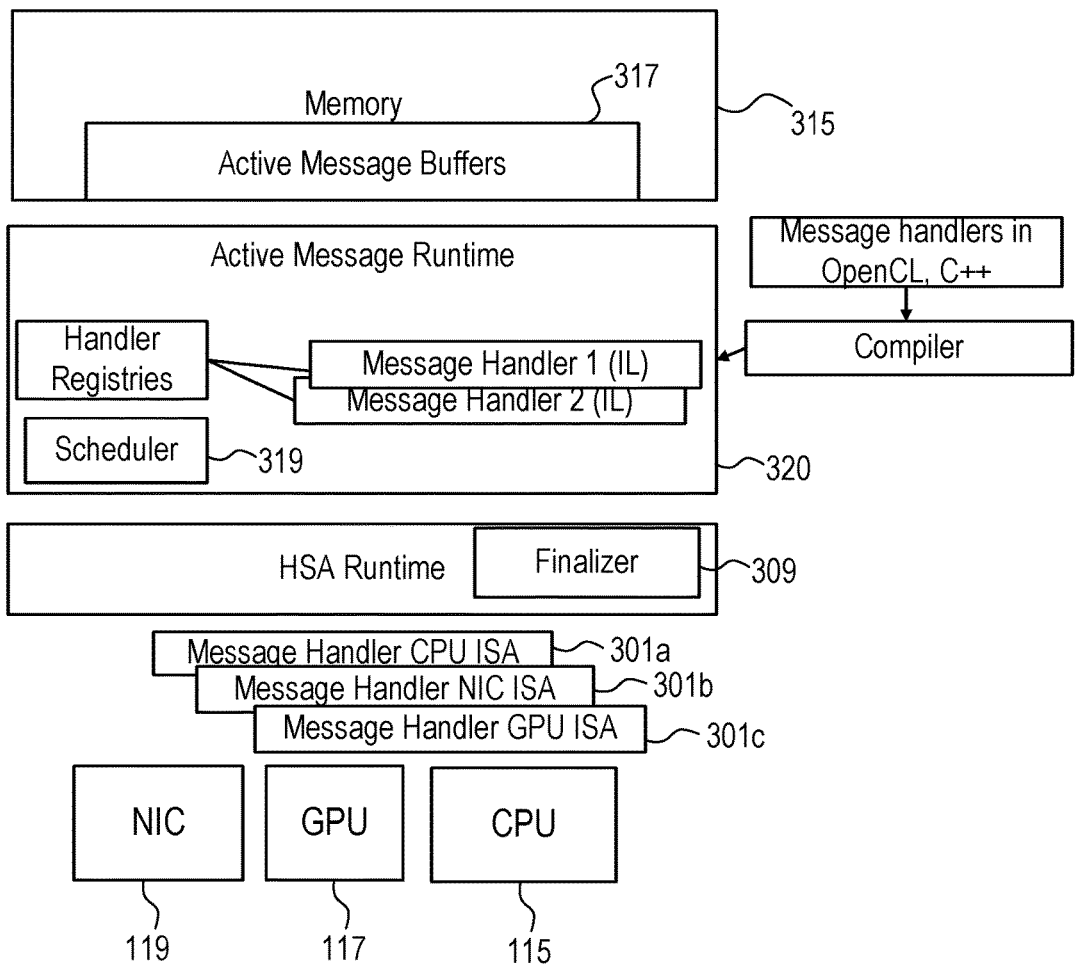
FIG. 3 illustrates aspects of software infrastructure associated with active messaging.

Heterogeneous architectures (e.g., multicore systems on the same silicon die with more than one type of processing core architected to function with a unified memory) introduce new problems for flexible and efficient active message enablement. Embodiments described herein provide mechanisms to support active messages, e.g., in an accelerated processing unit (APU) cluster, where an APU is an integrated circuit including one or more CPU and GPU cores. One focus herein is on the active-message infrastructure and compilation/delivery for message handlers. Embodiments described herein provide better programmability, code compiling/delivery, and scheduling of message handlers, exploiting the use of heterogeneous compute resources. The message handler can be stored in an intermediate format and compiled into instruction set architecture (ISA) code for execution in heterogeneous architectures.

Improving network performance is important for high-performance multi-node APU computation. Active messages are a classical approach to improve network performance (e.g., by reducing communication latency by efficiently utilizing available hardware resources in the network) and can be effectively utilized in heterogeneous architectures. An active message sent from a sender to a receiver carries a pointer to the message handler in the receiver, arguments, and other message payload. Using a simple example, assume the function to be performed is an atomic add +6 at address p (i.e., *p+6). The payload can carry the address "p" and the value 6. In general, the payload contains data necessary to complete an active message operation. At the receiver, when the message arrives, the handler is invoked to compute the function associated with the active message and the receiver generates a response based on the active message. The message handler is code that defines a computation to carry out at the receiver. The message handler code can be a simple fetch-and-add function to be executed on specified locations at the receiver and stored in specified locations (or returned to the sender) or may be more complex functions such as a Fast Fourier Transform (FFT) or array multiplication to be executed on arguments specified by, or transmitted with the active message.

FIG. 1 shows an example of an active message framework for a cluster of machine nodes with heterogeneous processors. The system shown in FIG. 1 includes a sending node 101 and a receive node 103. Senders such as threads executing in CPU 104 and GPU 105 can send active messages to the receive node 103 through a network communication channel 107. The receive and sending nodes may be located apart from each other or collocated. Thus, the receive node may be on a remote server or on the same backplane as the sending node. An active message sent from sending node 101 encodes information such as the target node number, message payload or message body having various information such as pointer/identification to the message handler (e.g., one of message handlers 109), handler arguments, operator (e.g., accumulate, min, sum if needed by the message handler) to be applied on the message and other useful information required for the particular active message. Note that if there are separate handlers for each operator, payload information such as operator may not be needed. The active message is executed at the receiver node 103 by invoking the appropriate one of the message handlers 109 identified in the active message to perform the computation.

Since the message handlers may execute on different processors and also users may want to configure/program their functionalities, a flexible way to define and compile the handlers is advantageous. In embodiments, the message handler is defined by the programmer in high-level cross-platform languages (e.g., OpenCL, C++). For instance, the message handler can be written in a similar way as what programmers develop for a GPU kernel. The active message runtime 111 provides a management application programming interface (API) to register the function as a message handler (e.g., register_handler(kernel_func_ptr)). So upon the arrival of the active message, the runtime 111 can locate the handler function to execute as specified in the active message. The active message function may be compiled from the high-level cross-platform language into an intermediate language (IL) format (e.g., Heterogenous System Architecture Intermediate Language (HSAIL)). The code in the IL format can be compiled to machine instruction set architecture (ISA) code by the finalizer (described in relation to FIG. 3) for execution on an appropriate one of the execution units. For example, the IL code may be compiled by the finalizer for execution on the CPU 115 or GPU 117.

Referring to FIG. 2, the active message 200 may include pointer field 201 that points to or otherwise identifies the message handler and the payload 205 (along with other fields not shown). In addition to various information identified above, the active message 200 may include a field 203 to specify a preferred execution unit to perform the function. For example, an active message associated with a mathematically intensive function may have a field that specifies execution on a GPU whereas another operation may specify the CPU, or a "don't care." In other embodiments, the active message may not have a field specifying a preferred execution.

FIG. 3 illustrates an example of software infrastructure associated with a system that utilizes active messaging. In a high performance computing (HPC) environment, all the nodes may already have the application codes and the message handlers. Thus, e.g., before the program starts running, each node will have access to all the necessary code (application, libraries, message handlers)—e.g. in a single program multiple data (SPMID) model. Thus, besides storing active message handlers in IL format, some precompiled (finalized) codes in machine ISAs may be prepared and stored. Thus, e.g., precompiled message handlers 301a, 301b, and 301c may be provided to execute on CPU 115 or GPU 117. Alternatively, handlers can be finalized on demand by finalizer 309 from a corresponding IL message handler during heterogeneous system architecture (HSA) runtime in response to receipt of an active message. The finalizer 309 provides compiler code that executes to compile the IL message handler to an appropriate machine ISA at runtime. For example, depending on the target execution unit, the finalizer may compile an IL message handler into GPU ISA message handler code or CPU ISA message handler code.

In some circumstances, the active message function required by the message is not located/known at the receiver, e.g., in a client-server, or cloud computing environment. In such a case, the sender may send an active message to a receiver but the active message handler is not available at the receiver. In response to receiving the active message, the receiver may reply to the sender indicating that the active message function is not available on the receiver. In response to receiving such a message indicating unavailability, the sender transfers the message handler code in the IL format to the receiver over the network. Once the IL message handler code is present on the receiver, the IL formatted code may be further compiled into the machine ISAs for the processors on the receiver by the finalizer 309. The new function is registered to the active message runtime 320 and cached at the receiver for future use.

The arrival of active messages interrupts the network interface controller (NIC) 119, which unpacks the messages and performs the computation by calling the message handler if the NIC has compute capability (e.g., with integrated processing units). As discussed above, active messages in some embodiments include a field to specify the preferred processor (e.g., CPU or GPU) to execute the active message. Alternatively, scheduler 319 may decide the preferred processor during the active message runtime based on the system utilization or some other criteria (e.g., predicting the best matching platform for executing the active message handler). The scheduler can push this task into an appropriate queue of the CPU or GPU for execution by calling the function in their corresponding machine ISA formats. Therefore, a message handler may maintain function pointers for multiple versions of code, one function pointer for each type of execution unit. Heterogeneous system architecture provides the queueing model and shared memory 315 that stores active message related information 317, such as handler registry information, intermediate language handlers, and compiled handlers, which simplifies scheduling of handler functions by scheduler 319.

In some embodiments, the active message runtime 320 can batch active messages with the same handler function. When the number of active messages with the same handler function surpasses a predetermined threshold, the active message runtime notifies the execution unit and the batched active messages are executed. Such batched execution may be more efficient than executing the active messages without batching. If active messages are being batched, a timeout function may be utilized to ensure that if the predetermined threshold number of active messages is not reached within a time threshold, the active messages currently batched are sent to the execution unit to ensure that an active message does not have a latency that is too long. Active message processing can also be distributed and assigned to different execution units (also referred to as compute units) and/or executed by different workgroups/wavefronts. A wavefront is a small number of work items (e.g., 64) that execute in lock step. A work item is a GPU thread. GPU applications leverage a large number of threads (i.e. work items) for parallelism. A workgroup includes multiple wavefronts (e.g., up to 256 work items) that execute on the same GPU core.

Once the active messages are processed, responses are generated and returned to the sender. The response may include the processed data, or an indication that the active message has been executed without data accompanying the response. The response may include a pointer to where results are located in the system.

Figure 4:
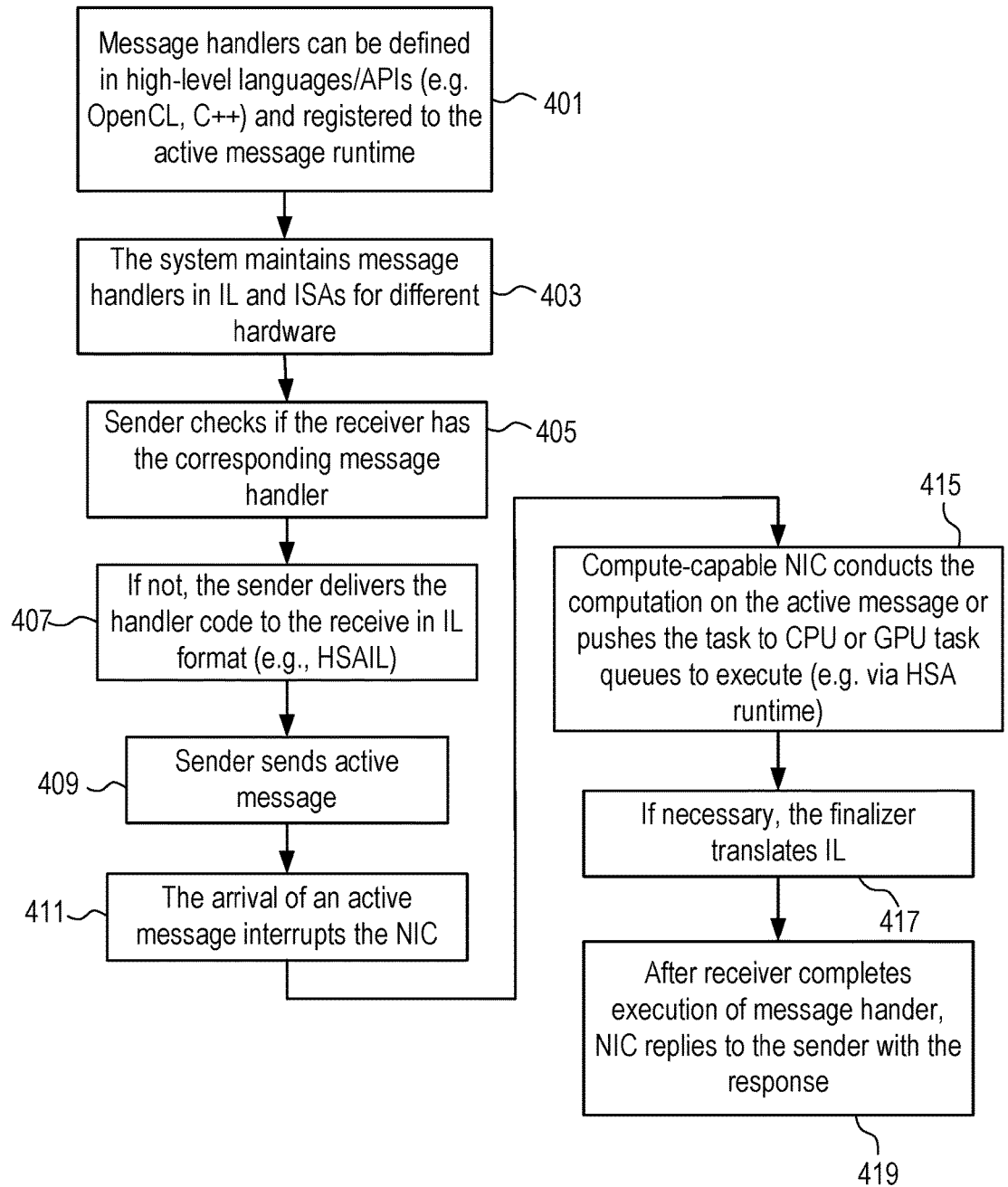
FIG. 4 shows a flow diagram associated with various aspects of active messages.

FIG. 4 illustrates a high level diagram of an embodiment of the process of creating and using active messages in an HSA environment. The message handlers can be defined in a high-level language/application programming interfaces (APIs), e.g., OpenCL or C++, and compiled into the IL format when the message handler library is built (i.e. before the program runs). The message handlers are registered to the active message runtime in 401 allowing the Active Message Runtime to be aware of the message handler by having a record in the handler registries (which stores pointers to handlers). For example, when the receiver receives a new message handler from a sender, the receiver creates a new message handler record in the handler registries so the handler is available for later use. In 403 the system maintains message handlers in an IL format but may also maintain message handlers in ISA formats for different hardware (e.g., various different ISAs may be utilized for different CPU architectures and different GPU architectures). In 405 and 407, the sender determines if the receiver has the message handler corresponding to the active message. That may be accomplished by the sender checking in 405 if the receiver has the message handler and, if not, sending the message handler in an IL format to the receiver in 407. Alternatively, the sender may send the active message and only send the message handler in an IL format if the receiver requests the message handler.

Various steps associated with the sending of the active message are shown in 409-419. In 409, the sender sends the active message to the receiver. In 411, the arrival of an active message interrupts the NIC in the receiver. In 415, the compute-capable NIC processes the active message. The NIC may push the active message task to the CPU or GPU task queues to execute. In 417, if necessary, the finalizer translates the IL into ISA format for execution. Finally, once the message handler execution is complete, the NIC in the receiver replies to the sender with the response in 419.

The description of the invention set forth herein is illustrative, and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. A method comprising:
   receiving an active message at a receiver including a plurality of types of execution units;
   compiling in the receiver an intermediate language message handler corresponding to the active message into a machine instruction set architecture (ISA) message handler of a selected one of the execution units; and
   executing the ISA message handler on the selected one of the execution units.

2. The method as recited in claim 1, further comprising:
   selecting the selected one of the execution units based on a field in the active message.

3. The method as recited in claim 1, further comprising:
   selecting the selected one of the execution units to execute a function based on a determination made by an active message runtime scheduler.

4. The method as recited in claim 1, further comprising:
   receiving the intermediate language message handler from a sender of the active message.

5. The method as recited in claim 4, further comprising:
   the receiver sending to the sender an indication that the receiver does not have the intermediate language message handler; and
   the sender sending the intermediate language message handler to the receiver responsive to the indication.

6. The method as recited in claim 1, wherein the selected one of the execution units is a central processing unit or a graphics processing unit.

7. The method as recited in claim 1, further comprising:
   storing a plurality of active messages having a same message handler for batch execution; and
   executing a message handler associated with the plurality of active messages after a threshold number of active messages have been stored.

8. The method as recited in claim 1, further comprising:
   storing one or more active messages having a same message handler for batch execution; and
   executing a message handler associated with the one or more active messages after a threshold period of time has expired or a threshold number of active messages have been stored, the threshold number being a number of active messages triggering batch execution.

9. An apparatus comprising:
   a receiving device including a plurality of execution units; and
   a communication interface in the receiving device coupled to receive an active message identifying a message handler corresponding to the active message;
   wherein the receiving device is responsive to receipt of the active message to compile an intermediate language message handler corresponding to the active message into a machine instruction set architecture message handler for execution on a selected one of the plurality of execution units.

10. The apparatus as recited in claim 9, wherein the selected one of the execution units is determined according to a field in the active message.

11. The apparatus as recited in claim 9, wherein the selected one of the execution units is determined according to an active message runtime scheduler.

12. The apparatus as recited in claim 9, further comprising:
    a sending device coupled to the receiving device over a communication interface; to send the active message to the receiving device.

13. The apparatus as recited in claim 12, wherein the sending device is configured to send the intermediate language message handler to the receiving device responsive to an indication that the receiving device does not have a message handler corresponding to the active message.

14. The apparatus as recited in claim 9, wherein the execution units include a central processing unit and a graphics processing unit.

15. The apparatus as recited in claim 9, wherein the receiving device is configured to:
    store for batch execution a plurality of active messages having a same message handler; and
    execute the same message handler corresponding to the plurality of active messages after a threshold number of active messages have been stored.

16. The apparatus as recited in claim 9, wherein the receiving device is configured to:
    store for batch execution one or more active messages having a same message handler; and
    execute the same message handler corresponding to the one or more active messages after a threshold period of time has expired or a threshold number of active messages have been stored.

17. A method comprising:
    storing a first message handler in a precompiled instruction set architecture (ISA) format at a receiver;
    storing a second message handler in an intermediate language format at the receiver;
    receiving a third message handler in an intermediate format from a sender of a first active message;

receiving a second active message at the receiver; and
executing one of the first, second and third message handlers in machine ISA format responsive to receipt of the second active message.

18. The method as recited in claim 17, further comprising:
registering the third message handler in the receiver;
compiling the third message handler from the intermediate format to a machine ISA format; and
executing the third message handler in the machine ISA format.

19. The method as recited in claim 17, further comprising:
the receiver sending to the sender an indication that the receiver does not have the third message handler prior to receiving the third message handler in an intermediate format.

* * * * *